United States Patent

Ailes et al.

[11] Patent Number: 6,017,291
[45] Date of Patent: Jan. 25, 2000

[54] CONTROL SYSTEM/METHOD FOR INPUT SHAFT RETARDER-ASSISTED UPSHIFTS

[75] Inventors: S. Terry Ailes, Kalamazoo; Alan R. Davis, Plainwell, both of Mich.

[73] Assignee: Eaton Corporation, Cleveland, Ohio

[21] Appl. No.: 09/039,749

[22] Filed: Mar. 16, 1998

[51] Int. Cl.[7] .................................................. B60K 41/06
[52] U.S. Cl. ................................................ 477/124; 74/339
[58] Field of Search .............................. 477/124, 77, 109, 477/118, 120, 91; 74/339, 411.5

[56] References Cited

U.S. PATENT DOCUMENTS

| | | | |
|---|---|---|---|
| 3,572,479 | 3/1971 | Kelley | 74/339 X |
| 3,834,499 | 9/1974 | Candellero et al. | 74/339 X |
| 4,361,060 | 11/1982 | Smyth . | |
| 4,595,986 | 6/1986 | Daubenspeck et al. . | |
| 4,648,290 | 3/1987 | Dunkley et al. . | |
| 5,086,659 | 2/1992 | Earp | 74/411.5 |
| 5,409,432 | 4/1995 | Steeby | 477/71 |
| 5,425,689 | 6/1995 | Genise | 477/120 |
| 5,433,676 | 7/1995 | Abe et al. | 477/120 X |
| 5,456,344 | 10/1995 | Nellums | 192/13 R |
| 5,528,950 | 6/1996 | Organek et al. | 74/339 |
| 5,842,376 | 12/1998 | Dresden, III et al. | 477/124 X |

FOREIGN PATENT DOCUMENTS

| | | |
|---|---|---|
| 0348732 | 1/1990 | European Pat. Off. . |
| 0686789 | 12/1995 | European Pat. Off. . |
| 4210626 | 10/1993 | Germany . |
| WO9113271 | 9/1991 | WIPO . |

*Primary Examiner*—Sherry L. Estremsky
*Attorney, Agent, or Firm*—Howard D. Gordon

[57] ABSTRACT

An improved control system/method for controlling input shaft retarding device (28/32) assisted upshifting in an at least partially automated vehicular mechanical transmission system (10). The input shaft (18) deceleration (dIS/dt) during an upshift is varied as a function of sensed gear ratio and/or throttle pedal position (THL).

11 Claims, 3 Drawing Sheets

CONTROL SYSTEM/METHOD FOR INPUT SHAFT RETARDER-ASSISTED UPSHIFTS

BACKGROUND OF THE INVENTION

1. Field of the Invention

The present invention relates to control logic for controlling upshifting in an at least partially automated mechanical transmission system having a device for providing a controllable retarding torque to the transmission input shaft and associated jaw clutch members and gearing to retard rotation thereof in a controllable manner.

2. Description of the Prior Art

The requirement of decreasing the rotational speed of the input shaft and the gears, jaw clutch members and shafts rotating therewith to accomplish an upshift in a mechanical transmission is well known in the prior art. Fully and partially automated vehicular mechanical transmission systems utilizing automatically controlled input shaft rotation retarding devices, such as engine brakes and/or input shaft brakes, to achieve smooth and/or rapid upshifts are known in the prior art, as may be seen by reference to U.S. Pat. Nos. 4,361,060; 4,595,986; 4,614,126; 4,648,290; 4,676,115; 5,425,689; 5,436,833; 5,409,432 and 5,582,558, the disclosures of which are incorporated herein by reference. Input shaft brakes, also called inertia brakes and upshift brakes, which apply a direct or indirect frictional or fluidic retarding force to the input shaft, are known in the prior art, as may be seen by reference to U.S. Pat. Nos. 5,086,659 and 5,528,950 and allowed application Ser. No. 08/681,255 (assigned to the assignee of this application), the disclosures of which are incorporated herein by reference.

The prior art controls for fully or partially automated vehicular mechanical transmission systems having controllable input shaft retarding devices have not optimized upshifting by controlling the retarding devices to retard input shaft rotation as a predetermined function of sensed previously engaged or target gear ratio and/or operator throttle pedal setting.

SUMMARY OF THE INVENTION

In accordance with the present invention, the drawbacks of the prior art are minimized or overcome by the provision of a vehicular fully or partially automated mechanical transmission system having a controllable input shaft retarding device for providing a controllable retarding torque for controllable deceleration of input shaft rotation for upshifts wherein the device is controlled as a function of gear ratio and/or throttle position.

The foregoing is accomplished by sensing the value of control parameters indicative of gear ratio and/or throttle position and, based upon those values and predetermined logic rules, determining a level of desirable input shaft retardation. A controllable input shaft retarding device is then caused to provide the required level of retardation to input shaft rotation.

Accordingly, a more responsive and/or smoother shifting fully or partially automated mechanical transmission system is provided.

This and other objects and advantages of the present invention will become apparent from a reading of the following description of the preferred embodiment taken in connection with the attached drawings.

DESCRIPTION OF THE PREFERRED EMBODIMENT

Figure 1:
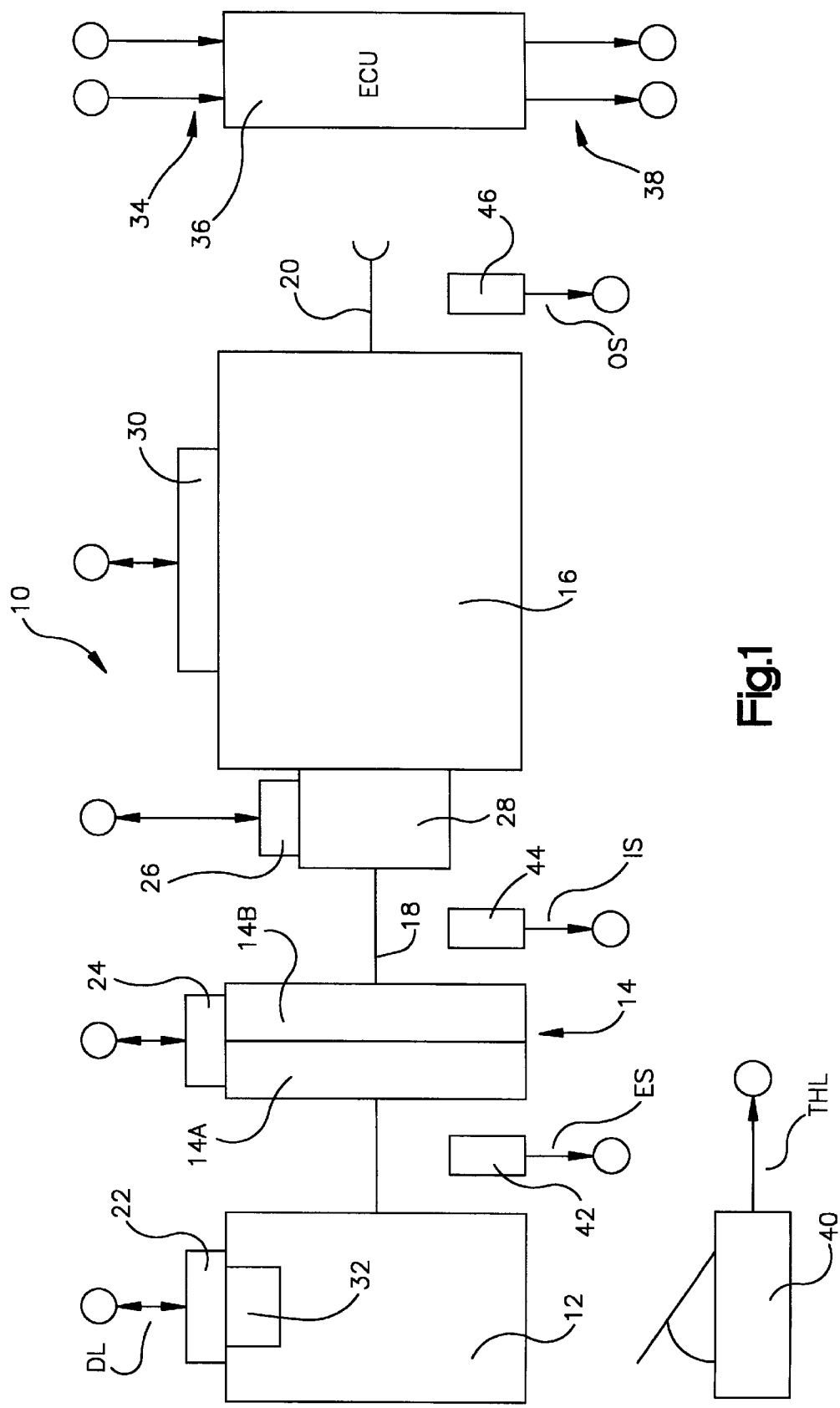
FIG. 1 is a schematic illustration of a vehicular automated mechanical transmission system advantageously utilizing the present invention.

A vehicular automated mechanical transmission system 10 of the type advantageously utilizing the control system/method of the present invention is schematically illustrated in FIG. 1. System 10 includes a fuel-controlled engine 12, a master friction clutch 14, and mechanical change gear transmission 16. Engine 12, through a flywheel, drives an input 14A to clutch 14, and a clutch output 14B drives the input shaft 18 to the transmission. The transmission 16 includes an output shaft 20 which drives the vehicle drivewheels through one or more drive axle assemblies (not shown). Fully or partially automated vehicular transmission systems of this general type are known in the prior art, as may be seen by reference to aforementioned U.S. Pat. Nos. 4,361,060; 4,648,290; 5,425,689; 5,409,432; 5,682,790 and 5,582,558.

Transmission 16 as may be of the known mechanical type utilizing positive jaw clutches to engage and disengage selected gears to shafts for changing the ratio of input shaft rotational speed (IS) to output shaft rotational speed (OS). Transmissions of this type may be seen by reference to U.S. Pat. Nos. 4,764,665; 5,385,056; 5,390,561 and 5,416,698, the disclosures of which are incorporated herein by reference.

System 10 includes an engine controller 22 for controlling fueling to the engine, a clutch actuator 24 for operating master clutch 14, and an input shaft brake operator 26 for controlling the operation of input shaft brake 28. A transmission operator 30 may be provided for shifting transmission 16. The engine 12 also may include an engine compression or exhaust brake 32, such as a "Jake Brake," which also will be controlled by engine controller 22. In alternative embodiments, manual operators for clutch 14, transmission 16 and/or engine brake 32 may be provided.

System 10 includes various sensors for providing input signals 34 to a system controller 36, which will process same according to predetermined logic rules to issue command output signals 38 to the system actuators. In the illustrated system, sensor 40 provides a signal THL indicative of the operator-set throttle position, sensor 42 provides a signal ES indicative of engine rotational speed, sensor 44 provides a signal IS indicative of input shaft 18 rotational speed, and sensor 46 provides a signal OS indicative of the rotational speed of output shaft 20. The controller 36 is preferably microprocessor-based and of the type illustrated in aforementioned U.S. Pat. No. 4,595,986. The controllers and sensors may communicate over a data link DL of the type conforming to an industry-accepted standard protocol such as SAE J-1922 or SAE J-1939.

As is known, given a known drive axle and tire configuration, vehicle speed may be determined as a function of the value of output shaft rotational speed OS. Engaged gear ratio may be sensed from a position sensor associated with actuator 30 and/or may be calculated from the relationship IS=OS*GR, as described in U.S. Pat. No. 4,849,899, the disclosure of which is incorporated herein by reference. The engaged or disengaged condition of clutch 14 may be determined from position sensors associated with the clutch actuator 24 and/or may be determined by comparing engine speed ES to input shaft speed IS (ES=IS±X?).

The control unit 36 may communicate with the sensors and actuators by means of a vehicular data link of the type conforming to SAE J-1922, SAE J-1939 and/or ISO 11898.

As is well known, in a non-synchronized mechanical transmission to achieve an upshift under substantially synchronous conditions, it is usually necessary to decrease the rotational speed IS of the input shaft 18 such that IS is generally equal to the product of output shaft speed and target gear ratio (i.e., IS≅OS*GR$_T$). It is also known to use clutch brakes, input shaft brakes 28 and/or engine brakes 32 (with the master clutch engaged) to achieve more rapid upshifts, especially if the vehicle is traveling up an incline and/or if the operator is indicating a desire for enhanced vehicle performance.

Applicants have determined that there is less time available in the lower gear ratios (i.e., first, second, third, fourth, etc. speeds in a 10 forward-speed transmission) for a quick upshift and, thus, a need for faster engine and/or input shaft deceleration in lower ratio upshifts than in higher ratio (i.e., eighth, ninth, tenth speeds in a 10-forward-speed transmission) upshifts. Accordingly, by sensing the current, just disengaged or target gear ratio during an upshift and, in the lower ratios, increasing the retarding effort of the retarding device and, thus, increasing the input shaft deceleration, an improved logic for input shaft retarding device enhanced upshifting is provided.

Further, by increasing the retarding effort and input shaft retardation as a function of increased throttle position (THL), the vehicle operator may input a desire for increased vehicle performance into the input shaft retarding device operational logic.

According to the upshift control logic of the present invention, the target input shaft deceleration (dIS/dt) is a function of gear ratio (target or just disengaged) and/or operator throttle pedal setting (THL).

Figure 2:
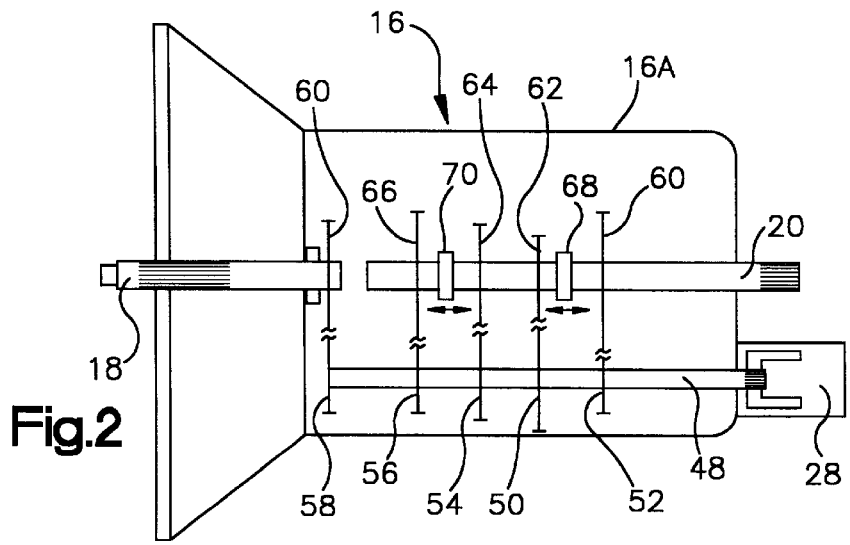
FIG. 2 is a schematic illustration of an input shaft retarding device mounted to a mechanical transmission.

FIG. 2 illustrates a non-synchronized mechanical transmission 16 having an input shaft 18 and an output shaft 20. An input or inertia brake 28 is illustrated as mounted at the rearward end of the transmission housing 16A to a rotating countershaft 48. Other mounting positions for brake 28 are possible. Countershaft 48 carries gears 50, 52, 54, 56 and 58, which are constantly driven by the input gear 60, which is fixed to the input shaft 18. Accordingly, countershaft 48 rotates with input shaft 18, as do countershaft gears 50, 52, 54, 56 and 58 and the main shaft gears 60, 62, 64 and 66 meshed therewith.

Double-sided sliding jaw clutch members 68 and 70 are splined to the shaft 20 for rotation therewith and relative axial movement for engaging a selected one of gears 60, 62, 64 or 66 to the shaft 20. Clutch members 68 and 70 are axially positioned by shift forks (not shown) controlled by the shift actuator 30. Simple transmissions of this type, and splitter- and/or range-type compound transmissions of the types illustrated in aforementioned U.S. Pat. No. 4,764,665 are widely used in heavy-duty trucks and other vehicles.

In a preferred embodiment of the present invention, an input shaft or inertia brake 28 of the type described in U.S. Pat. No. 5,528,950 is utilized. With an input shaft rotation retarding device of this type and a pulse width modulation control, input shaft deceleration has been shown to be controllable to a selectable value in the range of about zero RPM/second to 2000 RPM/second.

Other types of inertia brakes and/or engine brakes may be utilized to practice the present invention. By way of example, an engine brake on which one, two or three banks of cylinders may be subject to braking also may be used.

If an input shaft or inertia brake is utilized, sensing that the master clutch 14 and/or the transmission main section jaw clutches are disengaged may be a precondition for input shaft brake actuation. Similarly, if an engine brake is utilized, master clutch 14 engagement is a preferred condition for engine brake actuation.

Figure 3A:
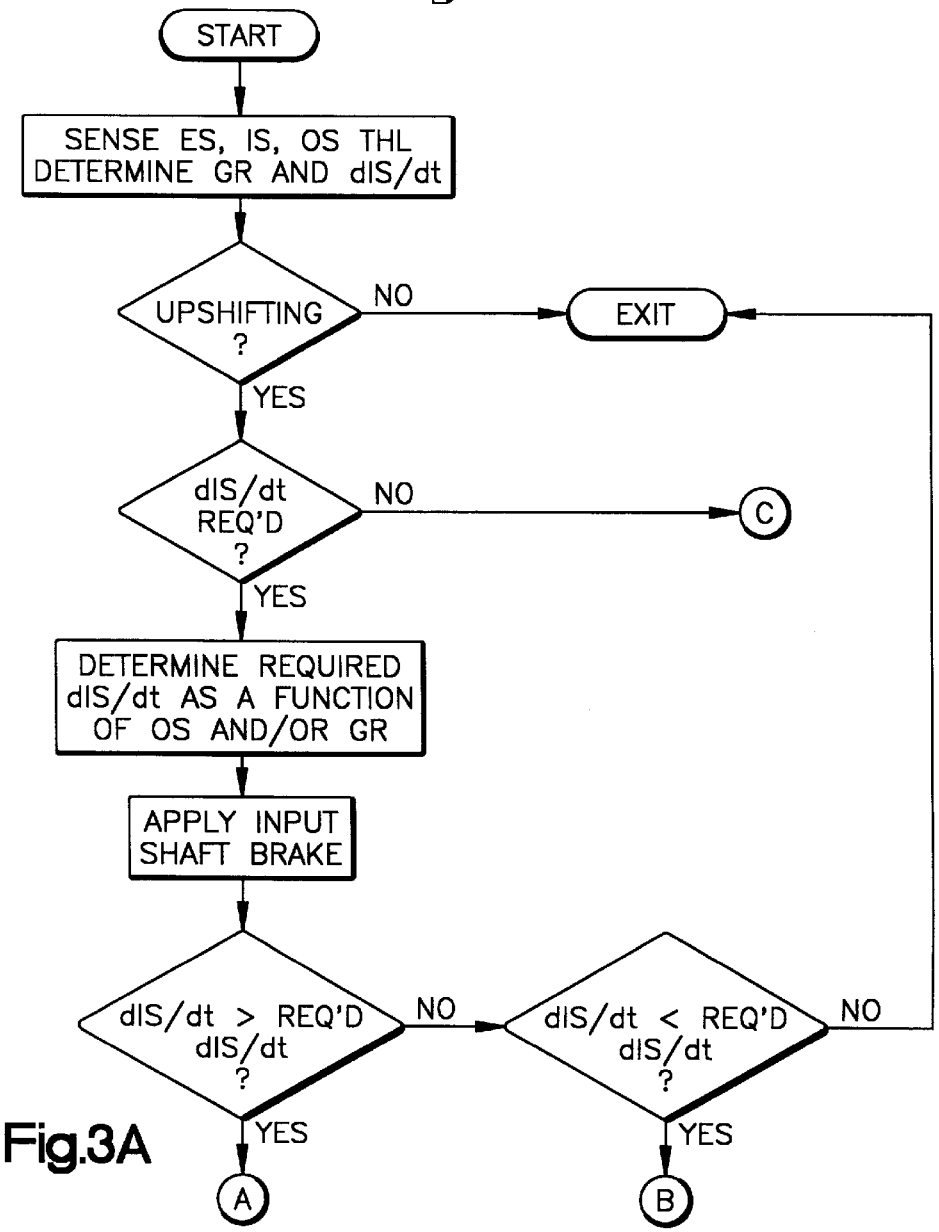
FIGS. 3A and 3B are a schematic illustration, in flow chart format, of the control method/system logic of the present invention.
Figure 3B:
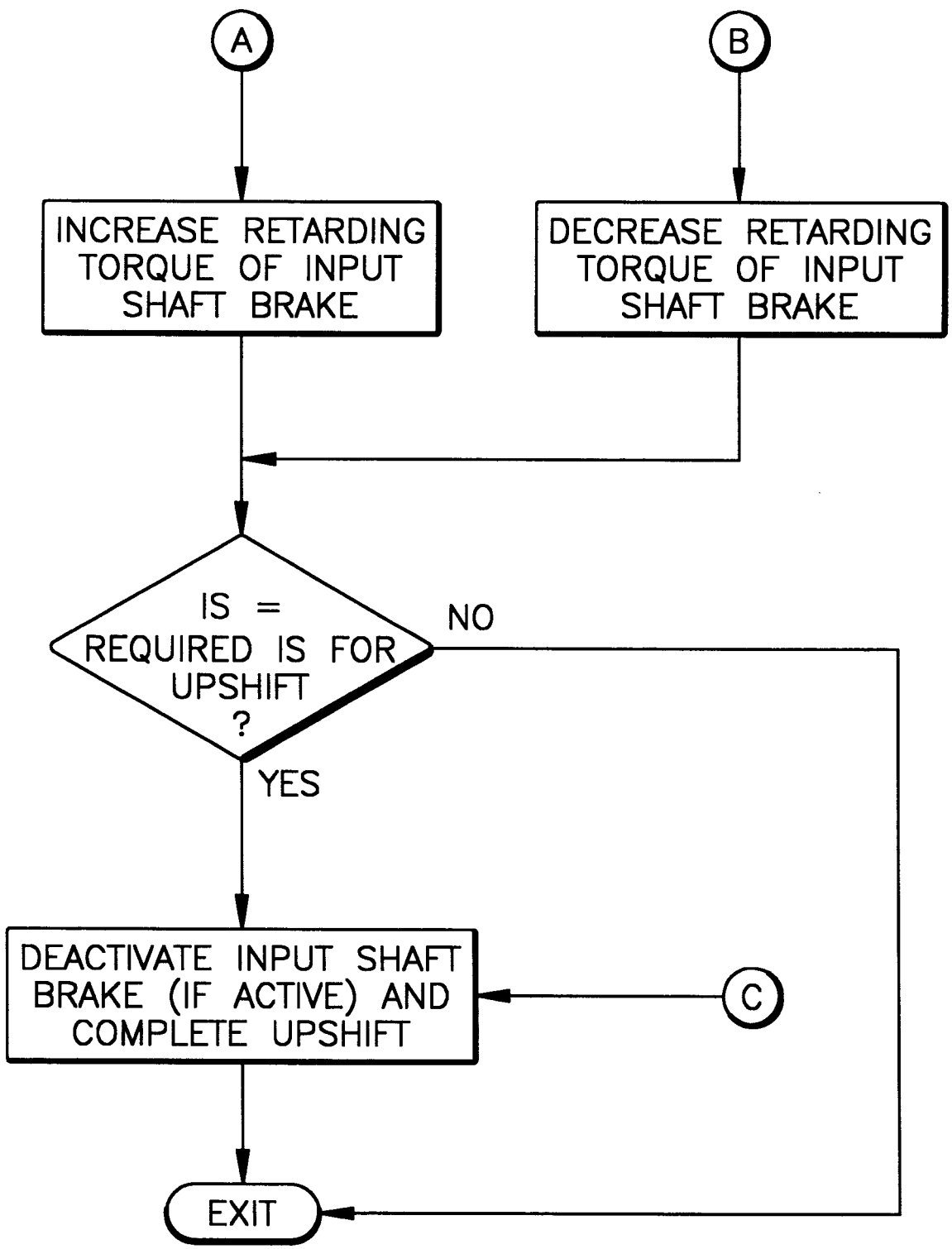

The control logic of the present invention is schematically illustrated in flow chart format in FIGS. 3A–3B.

Accordingly, it may be seen that a new and improved control system/method for input shaft retarding device-assisted upshifting is provided, which provides selectively variable input shaft retardation as a function of gear ratio and/or throttle pedal displacement.

Although the present invention has been described with a certain degree of particularity, it is understood that the description of the preferred embodiment is by way of example only and that numerous changes to form and detail are possible without departing from the spirit and scope of the invention as hereinafter claimed.

We claim:

1. An at least partially automated vehicular transmission system including a multiple-speed mechanical transmission having an input shaft driven by a fuel-controlled engine and an output shaft, said transmission selectively engageable in a plurality of drive ratios each defining a different numerical ratio of transmission input shaft rotational speed to transmission output shaft rotational speed, an input shaft rotation retarding device for selectively providing a selectively variable resistance to rotation of the transmission input shaft, an input shaft rotation retarding device actuator for operating said input shaft rotation retarding device, and a controller for receiving a plurality of input signals indicative of system operating conditions and for processing same according to logic rules to issue command output signals to system actuators, including said input shaft rotation retarding device actuator, said system characterized by said logic rules including rules for:

determining one of engaged, previously engaged and target drive ratio of said transmission, and causing said input shaft rotation retarding device to be operated to apply an increased resistance to rotation of said input shaft with a determined drive ratio having an increased numerical ratio of input shaft rotation to output shaft rotation.

2. The system of claim 1 wherein said logic rules include rules for determining operator request for engine fueling and rules for operating said input shaft rotation retarding device as a function of sensed operator request for engine fueling.

3. The system of claim 2 wherein said logic rules include rules for causing said input shaft rotation retarding device to be operated to apply increased resistance to input shaft rotation with increasing operator request for engine fueling.

4. The system of claim 2 wherein said logic rules include rules for determining a rate of change with respect to time of input shaft rotational speed (dIS/dt) and said logic rules cause said input shaft rotation retarding device to cause said rate of change to decrease with increased operator request for engine fueling.

5. The system of claim 1 wherein said logic rules include rules for determining a rate of change with respect to time of input shaft rotational speed (dIS/dt) and said logic rules cause said input shaft rotation retarding device to cause said rate of change to decrease with increased numerical ratio of input shaft rotation to output shaft rotation.

6. The system of claim 5 wherein said logic rules include rules for sensing operator request for engine fueling and rules for operating said input shaft rotation retarding device as a function of sensed operator request for engine fueling.

7. The system of claims 1, 2, 3, 5, 6, or 4, wherein said device is an input shaft brake.

8. A method for controlling an at least partially automated vehicular transmission system including a multiple-speed mechanical transmission having an input shaft driven by a fuel-controlled engine and an output shaft, said transmission selectively engageable in a plurality of drive ratios each defining a different numerical ratio of transmission input shaft rotational speed to transmission output shaft rotational speed, an input shaft rotation retarding device for selectively providing a selectively variable resistance to rotation of the transmission input shaft, an input shaft rotation retarding device actuator for operating said input shaft rotation retarding device, and a controller for receiving a plurality of input signals indicative of system operating conditions and for processing same according to logic rules to issue command output signals to system actuators, including said input shaft actuator, said method characterized by:

determining one of engaged, previously engaged and target drive ratio of said transmission, and causing said input shaft rotation retarding device to be operated to apply an increased resistance to rotation of said input shaft with a determined drive ratio having an increased numerical ratio of input shaft rotation to output shaft rotation.

9. The method of claim 8 further comprising determining operator request for engine fueling and operating said input shaft rotation retarding device as a function of sensed operator request for engine fueling.

10. The method of claim 9 wherein said input shaft rotation retarding device is operated to apply increased resistance to input shaft rotation with increasing operator request for engine fueling.

11. A method for controlling an at least partially automated vehicular transmission system including a multiple-speed mechanical transmission having an input shaft driven by a fuel-controlled engine and an output shaft, said transmission selectively engageable in a plurality of drive ratios each defining a different numerical ratio of transmission input shaft rotational speed to transmission output shaft rotational speed, an input shaft rotation retarding device for selectively providing a selectively variable resistance to rotation of the transmission input shaft, an input shaft rotation retarding device actuator for operating said input shaft rotation retarding device and a controller for receiving a plurality of input signals indicative of system operating conditions and for processing same according to logic rules to issue command output signals to system actuators including said input shaft rotation retarding device actuator, said method characterized by:

determining a rate of change with respect to time of input shaft rotational speed (dIS/dt);

determining operator request for engine fueling; and operating said input shaft rotation retarding device to cause said rate of change to decrease with increased operator request for engine fueling.

\* \* \* \* \*